July 26, 1966     L. H. MORIN     3,263,013
INTERCAST RELATIVELY MOVABLE PLASTIC ELEMENTS AND
METHOD OF FORMING THE SAME
Filed June 20, 1962     2 Sheets-Sheet 2
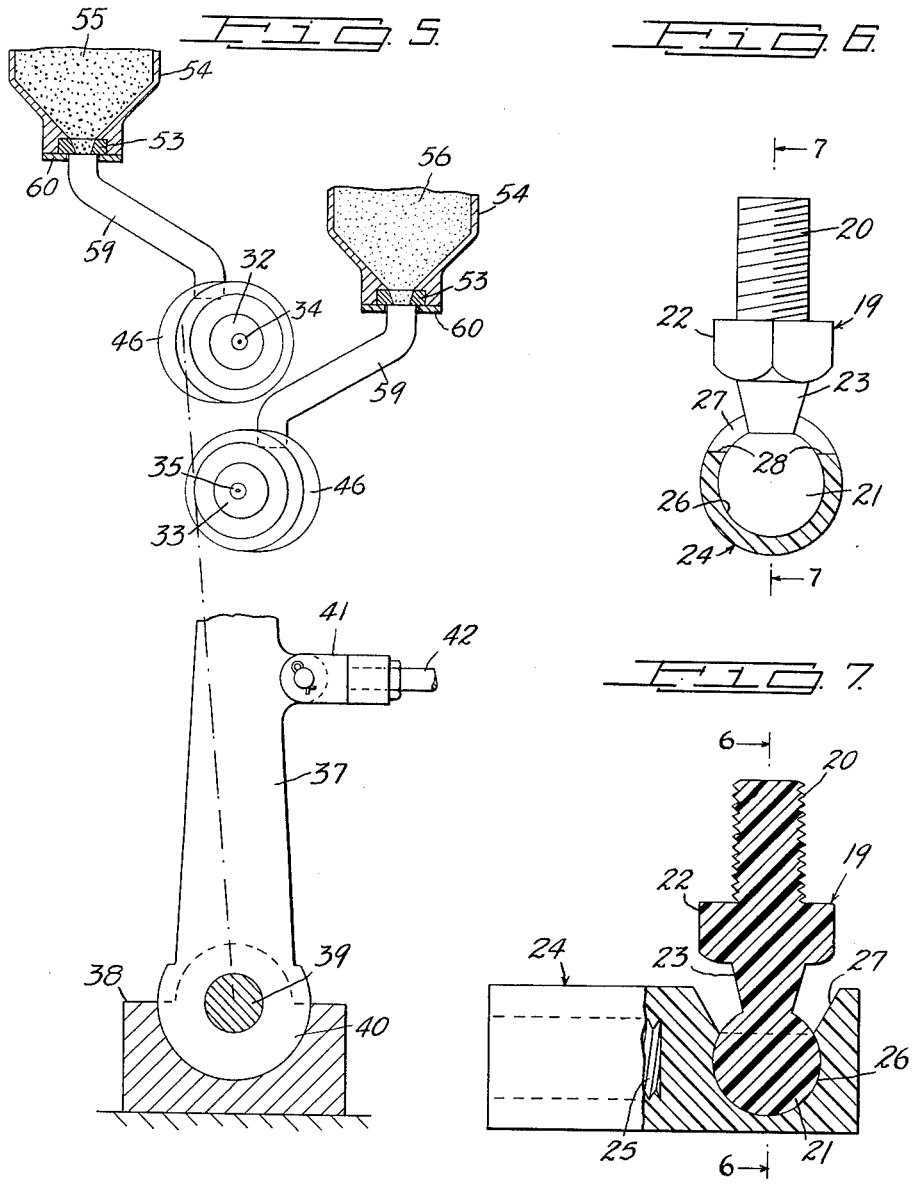
INVENTOR.
LOUIS H. MORIN
BY
Howard R. Thompson
ATTORNEY

United States Patent Office 3,263,013
Patented July 26, 1966

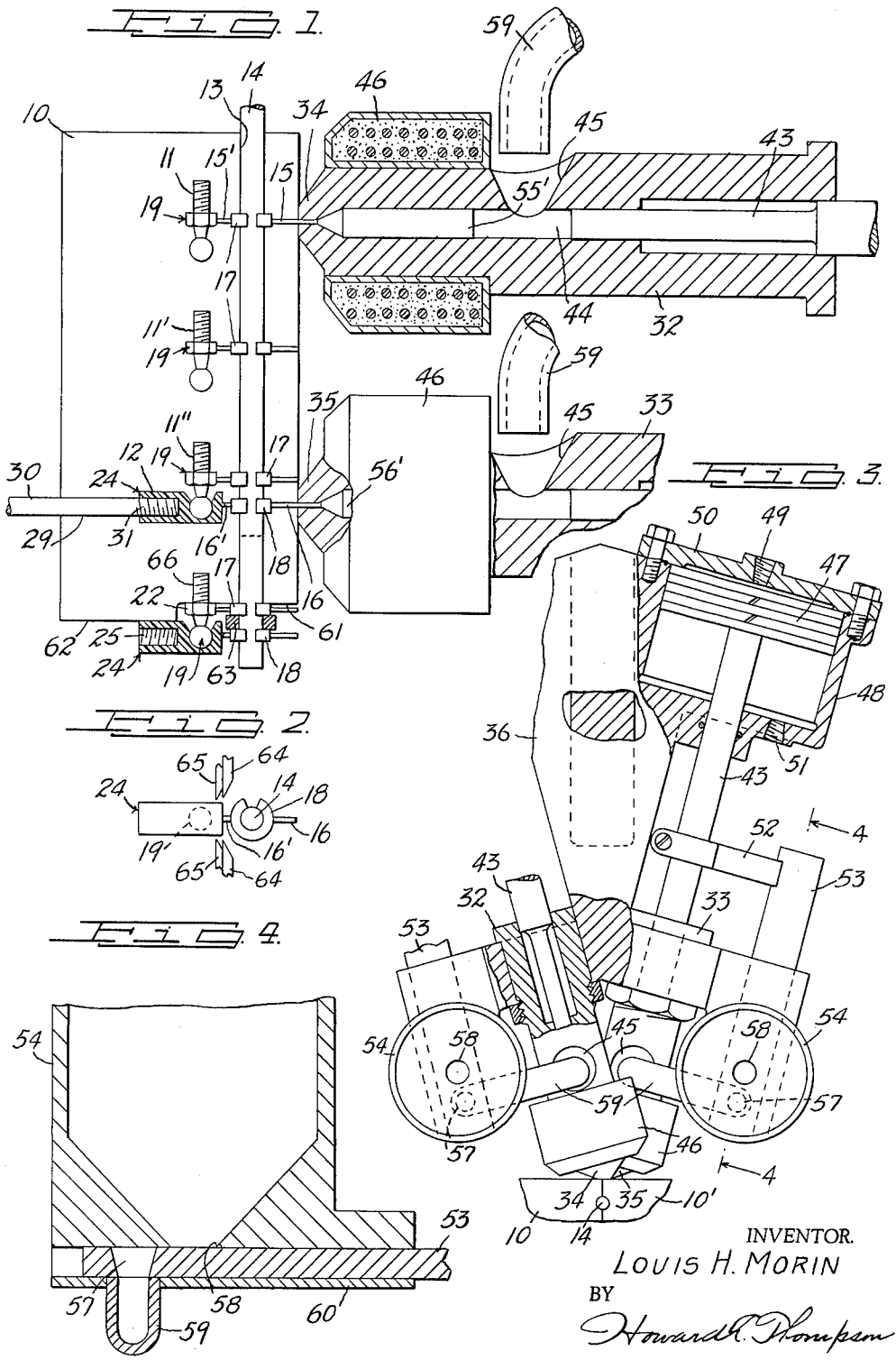

3,263,013
INTERCAST RELATIVELY MOVABLE PLASTIC ELEMENTS AND METHOD OF FORMING THE SAME
Louis H. Morin, Bronx, N.Y.
(125 Beechwood Ave., New Rochelle, N.Y.)
Filed June 20, 1962, Ser. No. 203,759
The portion of the term of the patent subsequent to June 1, 1982, has been disclaimed
6 Claims. (Cl. 264—242)

This invention relates to the intercasting of two elements formed of different plastic materials so that the elements of the end product are relatively movable one with respect to the other. More particularly, the invention deals with a method of producing intercast devices of the kind defined, whereby end products, comprising the two relatively movable elements, can be quickly and economically produced.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic face view of one die showing the one cast element in elevation and the second cast element in section and illustrating one injection cylinder in section, part of the other cylinder in section and elevation, the support for the cylinders being omitted.

FIG. 2 is a diagrammatic bottom plan view illustrating the trimming station for trimming the formed elements and omitting all background showing.

FIG. 3 is a diagrammatic sectional plan view on a reduced scale from the showing in FIG. 1, with parts of the construction broken away and parts in elevation.

FIG. 4 is an enlarged sectional detail view partially on the line 4—4 of FIG. 3.

FIG. 5 is a schematic face view of the front portions only of two injection cylinders, illustrating, in section, the supply of plastic materials thereto and showing, in part, the means for moving the cylinders into operative and inoperative positions, the operative position being shown by the position of the cylinders and the inoperative position is indicated by the dot-dash line.

FIG. 6 is an enlarged sectional view through a pair of intercast elements, the section being on the line 6—6 of FIG. 7, the one element being shown in elevation; and FIG. 7 is a sectional view on the line 7—7 of FIG. 6, with part of one element being shown in elevation.

My invention deals with the production of end products comprising intercast plastic elements, which are so cast as to provide relative movement of the elements one with respect to the other, regardless of the structural characteristics or form of the separate elements employed. In illustrating one adaptation and use of my invention, I have illustrated the intercasting of ball and socket elements, these elements being formed of plastic material having different melting points and, in accordance with my method, the first or primary cast element, such for example as the ball element, is formed of a higher melting point plastic than the secondary socket element to thereby prevent adhesion or fusion between the two elements. In some instances, it is also preferred to maintain the primary cast element at a cooling station, preparatory for positioning at the die station forming the secondary plastic element on the primary element.

Considering FIGS. 1 and 3 of the drawing, 10 represents one part of the die structure, the companion part, or a small portion thereof, being indicated at 10′ in FIG. 3 of the drawing, FIG. 1 representing a face view of the die part 10. In the construction shown, the dies have a cavity 11 and a similar cavity 11′ spaced with respect to 11 and between 11′ and the cavity 12, the latter including a cavity portion 11″. The dies include a vertical cavity 13 for a core and transfer pin 14. I have also shown two passages for forming gates 15 and 16 which communicate with passages forming open ring-like members 17 and 18, the dies having between 17 and 18 and the cavities 11 and 12 other passages for forming supplemental gates 15′, 16′. The dies further have passages for reception of the gates 15, 15′ and the open rings 17 at the stations where the cavities 11′, 11″ are located.

The cavity 11 is of a contour to form the primary cast element 19, which will generally be referred to as the ball element. Considering FIGS. 6 and 7 of the drawing, it will appear that the element 19 has an externally threaded end 20, a ball end 21, a central hexagon nut portion 22 joining the ball end in a neck portion 23. Formed in the cavity 12 is the secondary or socket element 24 and, considering FIG. 7 of the drawing, this element comprises an internally threaded shank end 25 and a socket 26 in the other end, the socket 26 having a widely flared opening 27 facilitating free universal movement of the elements 19 and 24 one with respect to the other. The opening 27 terminates in relatively flat opposed sides, as clearly illustrated at 28 in FIG. 6 of the drawing.

The die structure also includes a cavity portion, as at 29, FIG. 1, for a core pin 30 which, in the construction shown, has a threaded end 31 and, after casting the element 24 on the threaded end 31, the pin 30 is timely rotated and moved laterally for removal thereof from the threads 25 of the shank formed thereby.

Turning now to FIGS. 1, 3 and 5 of the drawing, I have here diagrammatically illustrated two injection cylinders 32 and 33, having nozzle ends 34 and 35, respectively, adapted to be brought into registering position with the passages forming the gates 15 and 16, as clearly illustrated in FIG. 1. The cylinders 32 and 33 are suitably supported in a swinging frame, the upper portion of which is shown, in part, at 36 in FIG. 3 and the lower portion of which is indicated at 37 in FIG. 5. In this latter figure, a block 38 is shown forming the support for a pivot shaft 39, upon which 37 is swingably mounted, the lower end of 37 having a rounded head 40 operating in a correspondingly formed socket in the bearing block 38. Coupled with 37 is a yoke 41 having an operating rod 42, by means of which 37, plus 36, can be swung from the cast position, indicated in full lines in FIG. 5, to the non-casting position, the center of which is indicated by the dot-dash line in FIG. 5. In this last position, the nozzle ends 34 and 35 are maintained upon the surface of the die 10 in sealing the discharge end of the nozzles, in accordance with teachings well known in this art.

Considering FIG. 3 of the drawing, it will appear that the cylinders 32 and 33 are angularly disposed with respect to each other, so as to maintain the two cylinders in reasonably close proximity to each other while, at the same time, providing for access of associated parts to the cylinder structure, as will clearly appear from a consideration of FIG. 3 of the drawing. As each cylinder is of the same construction, the brief description of one will apply to both and like references will designate like parts. Operating in the outer end of each cylinder is a plunger rod 43 suitably operated for advancement of plastic grains or crystals introduced into the bore 44 of the cylinder through an aperture 45 to the discharge end of the cylinder, which end has encircling the same a heating element 46, diagrammatically illustrated in section on the cylinder 32, the heating element 46 on the cylinder 33 being shown in elevation. Considering the right side of FIG. 3, the plunger rod 43 supports, at its end, a piston 47, operating in an air cylinder 48, the cylinder 48 having an air admission port 49 in the closure plate 50 of the cylinder and the lower end of the cylinder has an exhaust port 51. Coupled with the rod 43, intermediate the cylinders 32, 33 and the cylinders 48, is an extending finger 52 on a slide 53 operating in the lower portion of hoppers 54 supported in connection with or constituting part of the frame 36, in which the cylinders 32, 33 are supported. Considering the showing in FIG. 5 of the drawing, the hopper controlling feed to the cylinder 32 is positioned above and, of course, to one side of the hopper feeding the cylinder 33. In distinguishing these two cylinders one from the other, the upper hopper will be designated as the hopper supporting the high melting point plastic, diagrammtically illustrated in the stippling at 55; whereas, in the other hopper is the lower melting point plastic, diagrammatically illustrated by the stippling 56.

Considering FIG. 4 of the drawing, it will appear that the portion of the slide 54 operating in the lower portion of the hopper has a port 57 adapted to be brought into registration with the discharge end 58 of the hopper in picking up a predetermined measured amount of plastic crystals and delivering the same to the conveyor tube 59 directed to the apertures 45 of each of the cylinders, the lower discharge ends of these tubes being illustrated, in part, in FIG. 1, the tubes being diagrammatically shown more completely in FIG. 5. The lower ends of each of the hoppers include a plate 60 supporting the slides in position at the lower portion of the hoppers. No attempt has been made to show the crystals in FIG. 1 of the drawing. However, it will be apparent that, after having completed the formation of a casting, the previously advanced crystals would occupy the position shown at 55' and 56' in FIG. 1. The crystals will be deposited in front of the plunger rod 43, preparatory to the next casting operation of the machine, in which operation, the heated plastics, as at 55', 56', or at least a portion thereof, will be advanced in forming the resulting casting. At this time, it is also pointed out that the heating element 46, as applied to the cylinder 42, will operate at a higher temperature than the heating element 46 as applied to the cylinder 33, consistent with the reduction in the melting point between the two plastics 55', 56' employed.

By way of illustrating one adaptation and use of my invention, it can be said that the plastic crystals, as at 55, FIG. 5, are of nylon, having a melting point of approximately 480° F.; whereas, the crystals 56 could be for example Delrin crystals having a melting point of approximately 370° F., a differential of approximately 110° F. This difference in melting points is essential in the intercast operations performed in accordance with my method in preventing adhesion or fusion of the element 24 on the pre-cast element 19. In each cycle of operation, when the cylinders 32, 33 are brought into the registering position, as shown in FIG. 1 and indicated in FIG. 5, and as both of the rods 43 in these cylinders are actuated by suitable means, not shown, a cast element 19 is formed in the cavity 11 and a cast element 24 is formed in the cavity 12 around an element 19 then positioned in the cavity 11", as diagrammatically seen in FIG. 1. In the present structure, I have also illustrated the intermediate cavity station 11' which would be desirable in some types and kinds of end products being formed; thus, it will be apparent that, after having formed the intercast assemblage, as shown in FIG. 1 of the drawing, in the cavities 12, 11", then, upon separation of the dies, the element 19 which had been formed in the cavity 11 will be moved into the cavity 11' in downward movement of the transfer core or rod 14 and the element 19, which was positioned in the cavity 11', will be moved into position to fit in the cavity 11" and the intercast assemblage will have moved to the position shown at the lower portion of the die in FIG. 1 with the nut 22 of the element 19 and its associated open ring 17 in alinement with the offset surface 61 of the die; whereas, the element 24 will be in registering position with the lower surface 62 of the die. When the intercast assemblage is in this lower position, a fork-shaped member 63 is positioned between 17 of 19 and 18 of 22, so that, in raising the transfer core 14 to its normal casting position, both open rings 17 and 18 will be stripped from the core 14. Prior to this stripping operation, two pairs of trimming knives 64 and 65, arranged beneath the surface 61, will be actuated to trim the gates 15', 16' from the elements 19, 24, so as to free the intercast assemblage, comprising the elements 19 and 24 for deposit into a suitable receptacle; whereas, the stripped-off open rings 17 and 18 can be guided into a different receptacle. At this time, it is pointed out that, while the cavity 11 is contoured to form the threaded end 20 of 19, the portion of the cavities at 11', 11" can eliminate the threads and this would also be true of the cavity portion 66 provided at the lower portion of the dies for the reception of the threaded end 20 of 19.

In the above described stripper operation of the transfer core 14, it will be understood that the dies are brought into a partially or substantially closed position to maintain the first cast elements 19 at the stations 11', 11", preparatory to the next shot forming a new element 19 in 11 and the second element 24 on the element 19 then positioned in the station 11". In this connection, it must be understood that, in the illustration in FIG. 1 of the drawing, there should be no showing of the combined elements at the stripper and trimming station, as these elements, including the open sleeves 17 and 18, would not be present during the casting operation illustrated in forming the element 19 in 11 and the element 24 in 12 and on 19 positioned in 11". The transfer core 14 is then in the dotted position, indicated by the dotted line adjacent the cavity 12.

In repeated successive operations of the machine, the foregoing steps of procedure are followed and, in employing the conventionally cooled dies, the cast elements 19 and 24 will be quickly cooled and, by positioning 19 in the intermediate station 11', a greater cooling effect on the element 19 is provided, prior to positioning at the station 11" in forming the element 24 thereupon.

In producing different types and kinds of intercast assemblages, different plastic materials can be employed and, in all cases, the first or primary cast element will be formed of a higher melting point than the secondary cast element formed upon the first element when positioned at the cavity portion of the dies, in which the secondary element is formed. In some instances, my improved method can be utilized in simply establishing assemblage between two relatively movable members to eliminate later assemblage of the elements, for example, the casting of a nut upon the threaded portion of a screw or bolt in providing an end product employing two relatively movable components in an assembled state, preparatory for packaging and shipment.

In some instances, the threads at 31 can be eliminated from the core 30 and the threading of the bore, as at 25 in FIG. 7, can be accomplished by a separate operation. It will also be apparent that, by providing the intermediate station, as at 11', in addition to providing for the cooling of the element 19, this will result in speeding-up the successive casting operations in providing a greater production of the end product. By providing the open rings 17 and 18 on the transfer core 14, the stripping operation is facilitated.

It will be apparent that the element 24 only partially envelops the ball or spherical end 21 of the element 19 by virtue of the opening or what could be termed split portion in the element 24. It will be apparent that plastics not only of different melting points, but of different colors can be used as and when different colors would be desirable. By way of illustration, the contrast between the element 19 and the element 24 is brought out by the heavier plastic shading on 19 to indicate higher melting point and the lighter plastic shading of 24, designating the lower melting point or, in other words, a characteristic which would prevent adhesion or fusion of 24 on 19.

Having fully described my invention, what I claim as new and desire to secure by Letters Patent is:

1. The method of producing a multi-element thermoplastic product wherein said elements are connected but relatively and freely movable, which comprises injection molding a first element of thermoplastic of one melting point at a first molding station in a pair of dies, moving said first element to a second molding station in said dies, cooling said first element in said dies substantially to a solid integral mass, and injection molding upon at least a part of said cooled solid integral mass while in said dies at said second station a second element of thermoplastic of a lower melting point than the melting point of the plastic of the first element.

2. The method of producing a multi-element thermoplastic product wherein said elements are connected but relatively and freely movable, which comprises injection molding a first element of thermoplastic of one melting point at a first molding station in a pair of dies, moving said first element to a second molding station in said dies, cooling said first element in said dies substantially to a solid integral mass, and injection molding upon at least a part of said cooled solid integral mass while in said dies at said second station a second element of a thermoplastic of a lower melting point than the melting point of the plastic of the first element, and while said second element is being molded upon said first element at said second molding station injection molding another first element in said first molding station.

3. The method of producing a multi-element thermoplastic product wherein said elements are connected but relatively and freely movable, which comprises injection molding a first element of thermoplastic of one melting point at a first molding station in a pair of dies, moving said first element to a second molding station in said dies, cooling said first element in said dies substantially to a solid integral mass, injection molding upon at least a part of said cooled solid integral mass while in said dies at said second station a second element of thermoplastic of a lower melting point than the melting point of the plastic of the first element, each molding station including an independent injection cylinder having independent temperature controls for the high and low melting point thermoplastic at the first and second stations respectively, and while said second element is being molded upon said first element at said second molding station injection molding another first element in said first molding station.

4. The method of producing a multi-element thermoplastic product wherein said elements are connected but relatively and freely movable, which comprises injection molding a first element of thermoplastic of one melting point at a first molding station in a pair of dies, moving said first element to a second molding station in said dies, providing in said dies an intermediate cooling station between said first and second molding stations in which said first element is positioned and cooled substantially to a solid integral mass preparatory to positioning the cooled mass in said second molding station, positioning the cooled mass in said second station, and injection molding upon at least a part of said cooled solid integral mass while in said dies at said second station a second element of thermoplastic of a lower melting point than the melting point of the plastic of the first element, said molding stations being spaced apart in said pair of dies.

5. The method of producing a multi-element thermoplastic product wherein said elements are connected but relatively and freely movable, which comprises injection molding a first element of thermoplastic of one melting point at a first molding station in a pair of dies, moving said first element to a second molding station in said dies, providing in said dies an intermediate cooling station between said first and second molding stations in which said first element is positioned and cooled substantially to a solid integral mass preparatory to positioning the cooled mass in said second molding station, positioning the cooled mass in said second station, and injection molding upon at least a part of said cooled solid integral mass while in said dies at said second station a second element of thermoplastic of a lower melting point than the melting point of the plastic of the first element, said molding stations being spaced apart in said pair of dies, and while said second element is being molded upon said first element in said second molding station injection molding another first element in said first molding station.

6. The method of producing a multi-element thermoplastic product wherein said elements are connected but relatively and freely movable, which comprises injection molding a first element of thermoplastic of one melting point at a first molding station in a pair of dies, moving said first element to a second molding station in said dies, cooling said first element in said dies substantially to a solid integral mass, injection molding upon at least a part of said cooled solid integral mass while in said dies at said second station a second element of thermoplastic of a lower melting point than the melting point of the plastic of the first element, each molding station including an independent injection cylinder having independent temperature controls for the high and the low melting point thermoplastic at the first and second stations respectively.

References Cited by the Examiner
UNITED STATES PATENTS

| | | | |
|---|---|---|---|
| 2,482,205 | 9/1949 | Potts | 308—238 |
| 2,768,415 | 10/1956 | Morin. | |
| 2,819,494 | 1/1958 | Morin. | |
| 2,945,266 | 7/1960 | Mainardi. | |
| 2,970,869 | 2/1961 | Thomas | 308—238 |
| 3,011,219 | 12/1961 | Williams. | |
| 3,061,887 | 11/1962 | Clarke. | |

ROBERT F. WHITE, *Primary Examiner.*

LESLIE H. GASTON, *Examiner.*

F. MARLOWE, R. B. MOFFITT, *Assistant Examiners.*